United States Patent
Dimnaku et al.

(10) Patent No.: US 10,250,684 B2
(45) Date of Patent: Apr. 2, 2019

(54) METHODS AND SYSTEMS FOR DETERMINING PERFORMANCE CAPACITY OF A RESOURCE OF A NETWORKED STORAGE ENVIRONMENT

(71) Applicant: NETAPP, INC., Sunnyvale, CA (US)

(72) Inventors: Alma Dimnaku, Wellesley, MA (US); Leon Fairbanks, Winchester, MA (US)

(73) Assignee: NETAPP, INC., Sunnyvale, CA (US)

( * ) Notice: Subject to any disclaimer, the term of this patent is extended or adjusted under 35 U.S.C. 154(b) by 106 days.

(21) Appl. No.: 14/994,009

(22) Filed: Jan. 12, 2016

(65) Prior Publication Data

US 2017/0201580 A1 Jul. 13, 2017

(51) Int. Cl.
- *H04L 12/26* (2006.01)
- *H04L 29/08* (2006.01)
- *G06F 3/06* (2006.01)
- *G06F 17/30* (2006.01)

(52) U.S. Cl.
CPC .......... *H04L 67/1097* (2013.01); *G06F 3/067* (2013.01); *G06F 3/0611* (2013.01); *G06F 3/0653* (2013.01); *G06F 17/30598* (2013.01); *G06F 17/30867* (2013.01); *G06F 17/30958* (2013.01); *H04L 43/04* (2013.01); *H04L 43/045* (2013.01); *H04L 43/0852* (2013.01)

(58) Field of Classification Search
CPC ... G06Q 30/08; H04L 41/5054; H04L 47/783; H04L 67/10; H04L 67/16
USPC ................................................ 709/217–219
See application file for complete search history.

(56) References Cited

U.S. PATENT DOCUMENTS

| | | |
|---|---|---|
| 6,192,470 B1 | 2/2001 | Kelley et al. |
| 6,263,382 B1 | 7/2001 | Bartlett et al. |
| 7,613,947 B1 | 11/2009 | Coatney et al. |
| 7,664,798 B2 | 2/2010 | Wood et al. |
| 7,707,015 B2 | 4/2010 | Lubrecht et al. |
| 8,010,337 B2 | 8/2011 | Narayanan et al. |

(Continued)

OTHER PUBLICATIONS

Final Office Action on related US application (U.S. Appl. No. 4/805,770) dated Jun. 14, 2017.

(Continued)

*Primary Examiner* — Aftab N. Khan
(74) *Attorney, Agent, or Firm* — Klein, O'Neill & Singh, LLP

(57) ABSTRACT

Methods and systems for a network storage environment are provided. One method includes retrieving stored performance data associated with a resource used in the networked storage environment, where the stored performance data includes latency data, utilization data and a service time; filtering the stored performance data by removing any observations that are beyond a certain value of the service time; grouping the filtered stored performance into utilization bins and identifying a representative of each utilization bin; generating by the processor a hybrid latency versus utilization curve comprising a first portion that is based on the representative of each utilization bin and a second portion generated using a model based technique and determining by the processor available performance capacity of the resource using the hybrid latency versus utilization curve; where the available performance capacity is based on optimum utilization of the resource and actual utilization of the resource.

20 Claims, 17 Drawing Sheets

(56) References Cited

U.S. PATENT DOCUMENTS

| | | |
|---|---|---|
| 8,244,868 B2 | 8/2012 | La Frese et al. |
| 8,260,622 B2 | 9/2012 | Chron et al. |
| 8,274,909 B2 | 9/2012 | Harvell et al. |
| 8,412,672 B1 | 4/2013 | Radhakrishnan et al. |
| 8,531,954 B2 | 9/2013 | McNaughton et al. |
| 8,738,972 B1 | 5/2014 | Bakman et al. |
| 8,874,954 B1 | 10/2014 | Gupte et al. |
| 8,914,497 B1 | 12/2014 | Xiao et al. |
| 8,996,666 B2 | 3/2015 | Vasseur et al. |
| 9,009,296 B1 | 4/2015 | Siganporia et al. |
| 9,063,939 B2 | 6/2015 | Dalton |
| 9,128,965 B1 | 9/2015 | Yanacek et al. |
| 9,444,711 B1 | 9/2016 | Siganporia et al. |
| 9,645,901 B2 | 5/2017 | Nagaraj et al. |
| 9,830,238 B2 | 11/2017 | Mu et al. |
| 2002/0049845 A1 | 4/2002 | Sreenivasan et al. |
| 2002/0152305 A1 | 10/2002 | Jackson et al. |
| 2006/0074970 A1* | 4/2006 | Narayanan ......... G06F 11/3419 |
| 2006/0161883 A1 | 7/2006 | Lubrecht et al. |
| 2006/0168272 A1 | 7/2006 | Rustad et al. |
| 2007/0283016 A1 | 12/2007 | Pendarakis et al. |
| 2008/0059972 A1 | 3/2008 | Ding et al. |
| 2010/0075751 A1 | 3/2010 | Garvey et al. |
| 2010/0232288 A1 | 9/2010 | Coatney et al. |
| 2010/0262710 A1 | 10/2010 | Khatib et al. |
| 2010/0313203 A1 | 12/2010 | Dawson et al. |
| 2011/0197027 A1 | 8/2011 | Balasubramanian et al. |
| 2011/0225362 A1 | 9/2011 | Leggette |
| 2012/0011517 A1 | 1/2012 | Smith et al. |
| 2012/0084270 A1 | 4/2012 | Jayaraman et al. |
| 2012/0137002 A1 | 5/2012 | Ferris et al. |
| 2013/0124714 A1 | 5/2013 | Bednar |
| 2013/0159548 A1 | 6/2013 | Vasseur et al. |
| 2013/0173804 A1 | 7/2013 | Murthy et al. |
| 2013/0204960 A1 | 8/2013 | Ashok et al. |
| 2013/0227111 A1 | 8/2013 | Wright et al. |
| 2013/0304903 A1* | 11/2013 | Mick ............... H04L 43/0817 709/224 |
| 2014/0047040 A1 | 2/2014 | Patiejunas et al. |
| 2014/0068053 A1 | 3/2014 | Ravi et al. |
| 2014/0095696 A1* | 4/2014 | Sala ............... G06F 11/3409 709/224 |
| 2014/0165060 A1 | 6/2014 | Muller et al. |
| 2014/0372607 A1 | 12/2014 | Gladwin et al. |
| 2015/0006733 A1 | 1/2015 | Khan et al. |
| 2015/0095892 A1 | 4/2015 | Baggott et al. |
| 2015/0235308 A1* | 8/2015 | Mick ............ G06Q 30/08 705/26.3 |
| 2015/0295827 A1 | 10/2015 | Zhu et al. |
| 2016/0065492 A1 | 3/2016 | Hu et al. |
| 2016/0112275 A1 | 4/2016 | Park et al. |
| 2016/0150030 A1 | 5/2016 | Apte et al. |
| 2016/0173571 A1 | 6/2016 | Bragstad et al. |

OTHER PUBLICATIONS

Final Office Action on co-pending US application (U.S. Appl. No. 14/805,804) dated Oct. 6, 2017.
Notice of Allowance on related US application (U.S. Appl. No. 14/805,851) dated Aug. 31, 2016.
Office Action on related US application (U.S. Appl. No. 14/805,829) dated Nov. 8, 2016.
Notice of Allowance on related US application (U.S. Appl. No. 14/805,829) dated Jan. 4, 2017.
Office Action on co-pending US application (U.S. Appl. No. 14/805,770) dated Jan. 23, 2017.
Non-Final Office Action on co-pending US application (U.S. Appl. No. 14/805,804) dated May 5, 2017.
Non-Final Office Action on co-pending US application (U.S. Appl. No. 15/071,917) dated Dec. 1, 2017.
Non-Final Office Action on co-pending US application (U.S. Appl. No. 15/098,007) dated Apr. 12, 2018.
Notice of Allowance on co-pending US application (U.S. Appl. No. 14/805,804) dated Jan. 19, 2018.
Non-Final Office Action on co-pending US application (U.S. Appl. No. 15/090,878) dated Dec. 22, 2017.
Non-Final Office Action on co-pending US application (U.S. Appl. No. 15/141,357) dated Dec. 15, 2017.
Non-Final Office Action on co-pending US application (U.S. Appl. No. 14/805,770) dated Dec. 20, 2017.
Final Office Action on co-pending US application (U.S. Appl. No. 15/090,878) dated May 18, 2018.
Notice of Allowance on co-pending US application (U.S. Appl. No. 15/071,917) dated May 25, 2018.
Notice of Allowance on co-pending US application (U.S. Appl. No. 15/141,357) dated May 29, 2018.
Non-Final Office Action on co-pending US application (U.S. Appl. No. 15/896,363) dated Aug. 30, 2018.
Final Office Action on co-pending US application (U.S. Appl. No. 14/805,770) dated Oct. 2, 2018.
Final Office Action on co-pending U.S. Appl. No. 15/098,007 dated Dec. 10, 2018.
Notice of Allowance on co-pending U.S. Appl. No. 15/090,878 dated Oct. 25, 2018.

* cited by examiner

METHODS AND SYSTEMS FOR DETERMINING PERFORMANCE CAPACITY OF A RESOURCE OF A NETWORKED STORAGE ENVIRONMENT

TECHNICAL FIELD

The present disclosure relates to managing resources in a networked storage environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is a metric used in a storage environment to provide certain throughput for processing input/output (I/O) requests for reading or writing data, a response time goal within, which I/O requests are processed and a number of I/O requests processed within a given time (for example, in a second (IOPS). Throughput means amount of data transferred within a given time, for example, in megabytes per second (Mb/s).

To process an I/O request to read and/or write data, various resources are used within a storage system, for example, processors at storage system nodes, storage devices and others. The different resources perform various functions in processing the I/O requests and have finite performance capacity to process requests. As storage systems continue to expand in size, complexity and operating speeds, it is desirable to efficiently monitor and manage resource usage and know what performance capacity of a resource may be available at any given time. Continuous efforts are being made to better manage resources of networked storage environments.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

Figure 1A:
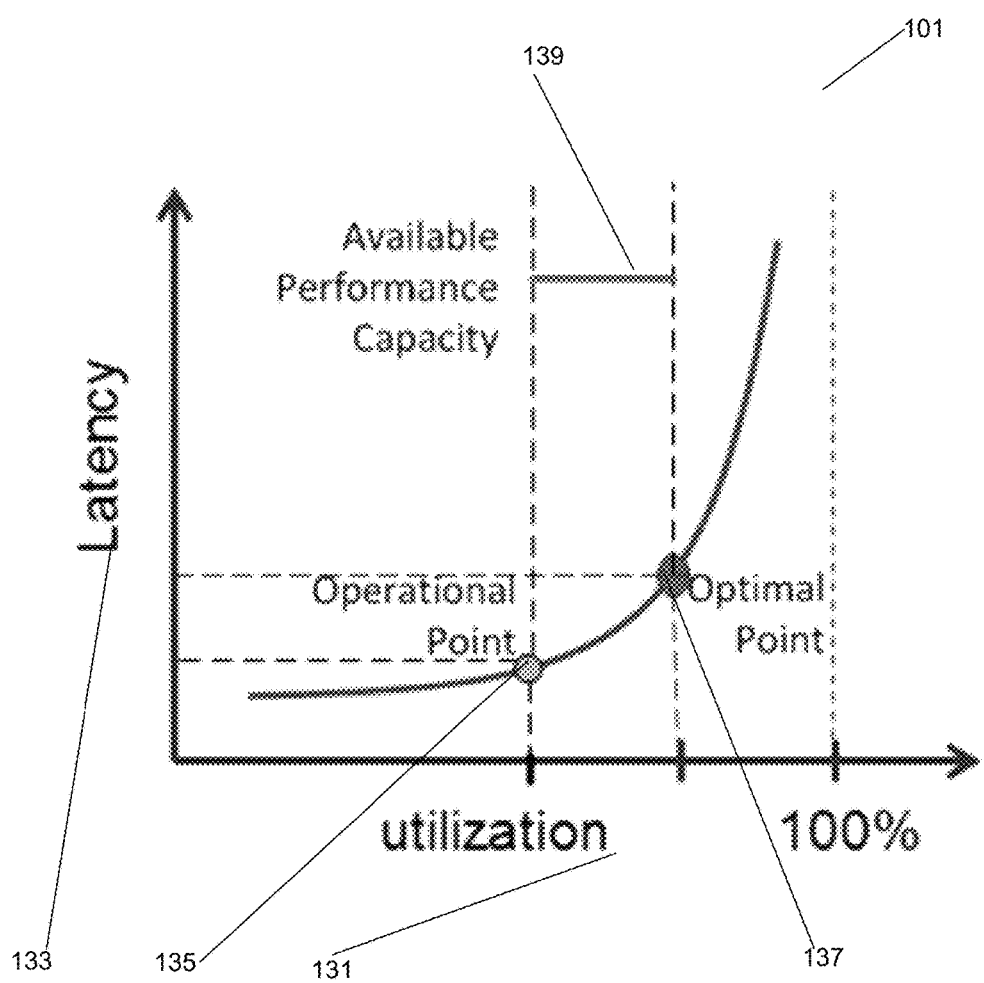
FIG. 1A shows an example of a latency v. utilization curve (LvU), for determining headroom, according to one aspect of the present disclosure.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, a performance manager module is provided that interfaces with a storage operating system to collect quality of service (QOS) data (or performance data) for various resources. QOS provides a certain throughput (i.e. amount of data that is transferred within a given time interval (for example, megabytes per seconds (MBS)), latency and/or a number of input/output operations that can be processed within a time interval, for example, in a second (referred to as IOPS). Latency means a delay in completing the processing of an I/O request and may be measured using different metrics for example, a response time in processing I/O requests.

In one aspect, methods and systems for a network storage environment are provided. One method includes retrieving stored performance data associated with a resource used in the networked storage environment, where the stored performance data includes latency data, utilization data and a service time; filtering the stored performance data by removing any observations that are beyond a certain value of the service time; grouping the filtered stored performance into utilization bins and identifying a representative of each utilization bin; generating by the processor a hybrid latency versus utilization curve comprising a first portion that is based on the representative of each utilization bin and a second portion generated using a model based technique and determining by the processor available performance capacity of the resource using the hybrid latency versus utilization curve; where the available performance capacity is based on optimum utilization of the resource and actual utilization of the resource.

Headroom/Performance Capacity:

In one aspect, methods and systems for managing resources in a networked storage environment is provided. The resources may be managed based on remaining (or useful) performance capacity at any given time that is available for a resource relative to a peak/optimal performance capacity without violating any performance expectations. The available performance capacity may be referred to as "headroom" that is discussed in detail below. The resource maybe any resource in the networked storage environment, including processing nodes and aggregates that are described below in detail. Peak performance capacity of a resource may be determined according to performance limits that may be set by policies (for example, QoS or service level objectives (SLOs) as described below).

In one aspect, the remaining or available performance capacity is determined from a relationship between latency and utilization of a resource. FIG. 1A shows an example of one such relationship. Latency 133 for a given resource that is used to process workloads is shown on the vertical, Y-axis, while the utilization 131 of the resource is shown on the X-axis.

The latency v utilization curve shows an optimal point 137, after which latency shows a rapid increase. Optimal point represents maximum (or optimum) utilization of a resource beyond which an increase in workload are associated with higher throughput gains than latency increase. Beyond the optimal point, if the workload increases at a resource, the throughput gains or utilization increase is smaller than the increase in latency. An optimal point may be determined by a plurality of techniques defined below. The optimal point may also be customized based on a service level that guarantees certain latency/utilization for a user. The use of optimal points are described below in detail.

An operational point 135 shows current utilization of the resource. The available performance capacity is shown as 139. In one aspect, the operational point 135 may be determined based on current utilization of a resource. The operational point may also be determined based on the effect of internal workloads (for example, when a storage volume is moved), when a storage node is configured as a high availability failover node or when there are workloads that can be throttled or delayed because they may not be very critical.

In one aspect, headroom (or performance capacity) may be based on the following relationship:

$$\text{Headroom} = \frac{\text{Optimal Point} - \text{Operational Point}}{\text{Optimal Point}}$$

Headroom may be based on current utilization and a current optimal point that is ascertained based on collected and observed data. This is referred to "sampled" headroom. The sampled headroom may be modified by updating the current utilization of the resource to reflect any high availability node pair load (defined below) or any work that can be throttled or defined as not being critical to a workload mix. The term workload mix represents user workloads at a resource.

Before describing the processes for generating the relationship between latency v utilization (may also be referred to as LvU), the following provides a description of the overall networked storage environment and the resources used in the operating environment for storing data.

Figure 1B:
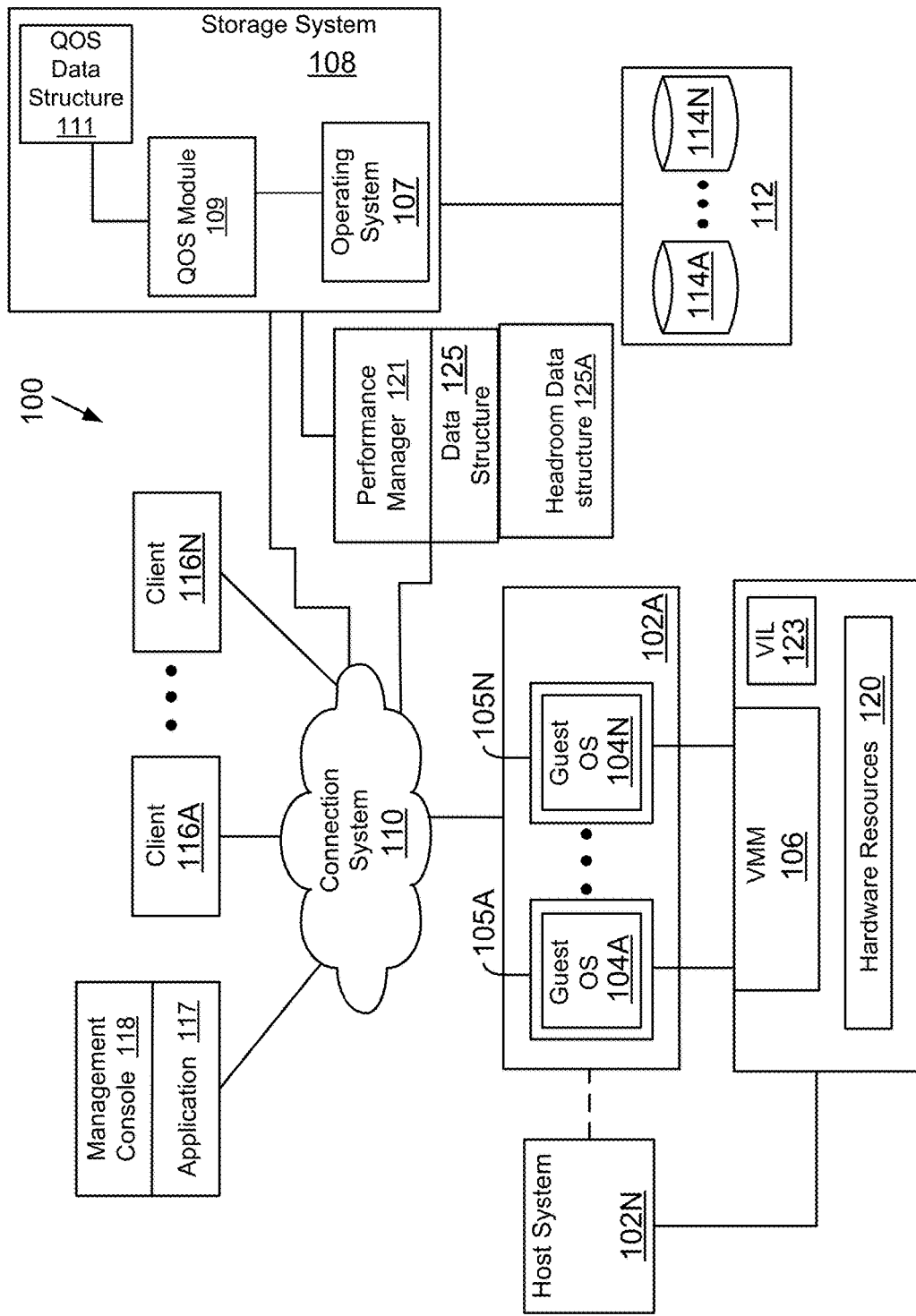
FIG. 1B shows an example of an operating environment for the various aspects disclosed herein.

System 100:

FIG. 1B shows an example of a system 100, where the various adaptive aspects disclosed herein may be implemented. System 100 includes a performance manager 121 that interfaces with a storage operating system 107 of a storage system 108 for receiving QOS data. The performance manager 121 may be a processor executable module that is executed by one or more processors out of a memory device.

The performance manager 121 obtains the QOS data and stores it at a data structure 125. In one aspect, performance manager 121 analyzes the QOS data for determining headroom for a given resource. Headroom related information may be stored at data structure 125A that is described below in detail. Details regarding the various operations performed by the performance manager 121 for determining headroom are provided below.

In one aspect, storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines (VMs) 105A-105N). A storage volume is a logical storage object and typically includes a file system in a NAS environment or a logical unit number (LUN) in a SAN environment. The various aspects described herein are not limited to any specific format in which physical storage is presented as logical storage (volume, LUNs and others).

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit.

The QOS policy information may be stored at a QOS data structure 111 maintained by a QOS module 109. QOS at the storage system level may be implemented by the QOS module 109. QOS module 109 maintains various QOS data types that are monitored and analyzed by the performance manager 121, as described below in detail.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102A includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102A with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1B may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1B, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels (also referred to as service level objectives or "SLOs"), where a client with a higher service level may be provided with more storage space than a client with a lower service level. A client at a higher level may also be provided with a certain QOS vis-á-vis a client at a lower level.

Figure 2A:
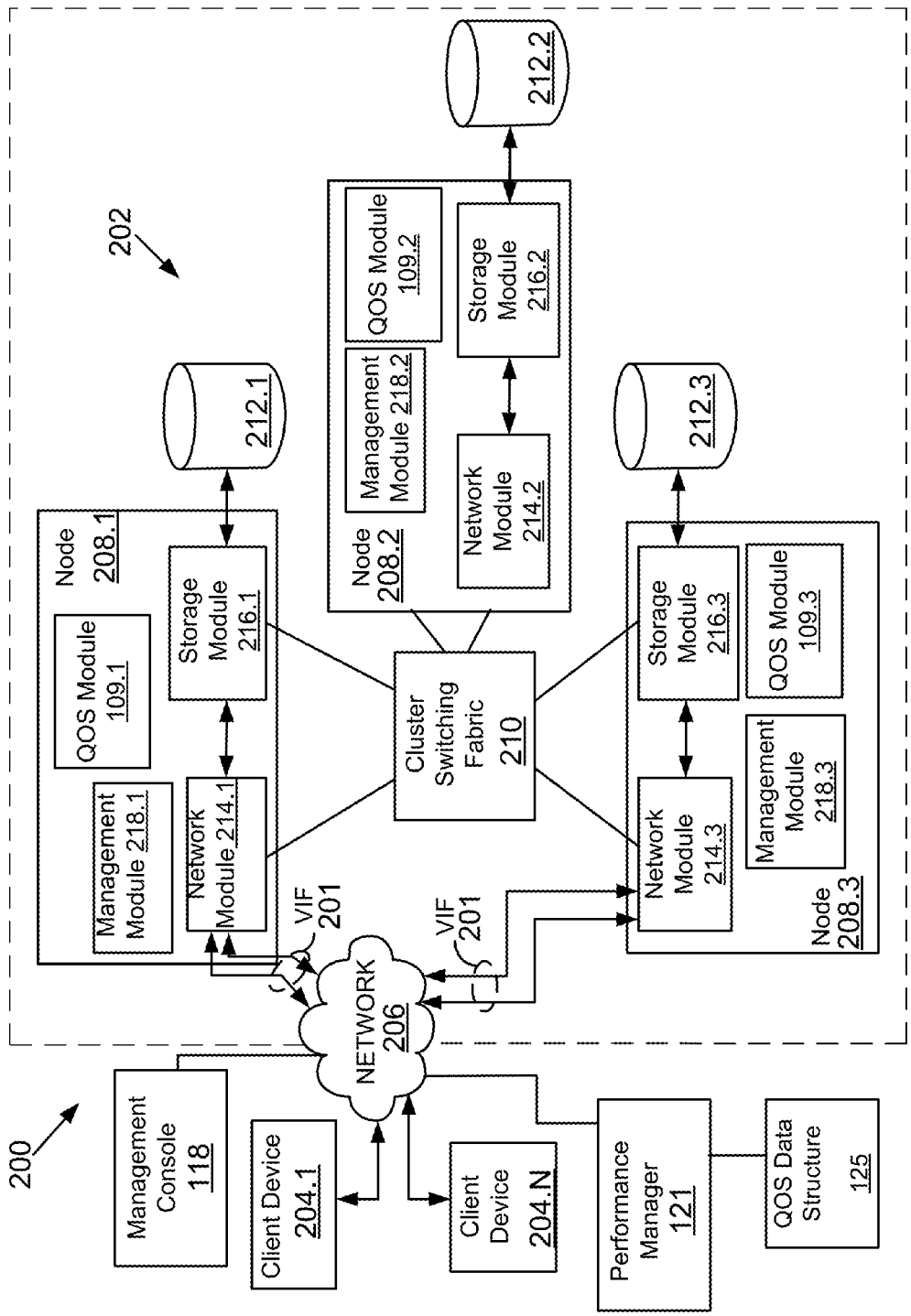
FIG. 2A shows an example of a clustered storage system, used according to one aspect of the present disclosure.

Although storage system 108 is shown as a stand-alone system, i.e. a non-cluster based system, in another aspect, storage system 108 may have a distributed architecture; for example, a cluster based system of FIG. 2A. Before describing the various aspects of the performance manager 121, the following provides a description of a cluster based storage system.

Clustered Storage System:

FIG. 2A shows a cluster based storage environment 200 having a plurality of nodes for managing storage devices, according to one aspect. Storage environment 200 may include a plurality of client systems 204.1-204.N (similar to clients 116A-116N, FIG. 1B), a clustered storage system 202, performance manager 121, management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114) that are used as resources for processing I/O requests.

Each of the plurality of nodes 208.1-208.3 is configured to include a network module (maybe referred to as N-module), a storage module (maybe referred to as D-module), and a management module (maybe referred to as M-Module), each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N over the computer network 206, while the storage modules 216.1-216.3 connect to one or more of the storage devices 212.1-212.3. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212.

Each node may execute or interface with a QOS module, shown as 109.1-109.3 that is similar to the QOS module 109. The QOS module 109 may be executed for each node or a single QOS module may be used for the entire cluster. The aspects disclosed herein are not limited to the number of instances of QOS module 109 that may be used in a cluster.

A switched virtualization layer including a plurality of virtual interfaces (VIFs) 201 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM has a client domain and a security domain that are separate from the client and security domains of other SVMs. Moreover, each SVM is associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Performance manager 121 interfaces with the various nodes and obtains QOS data for QOS data structure 125. Details regarding the various modules of performance manager are now described with respect to FIG. 2B.

Figure 2B:
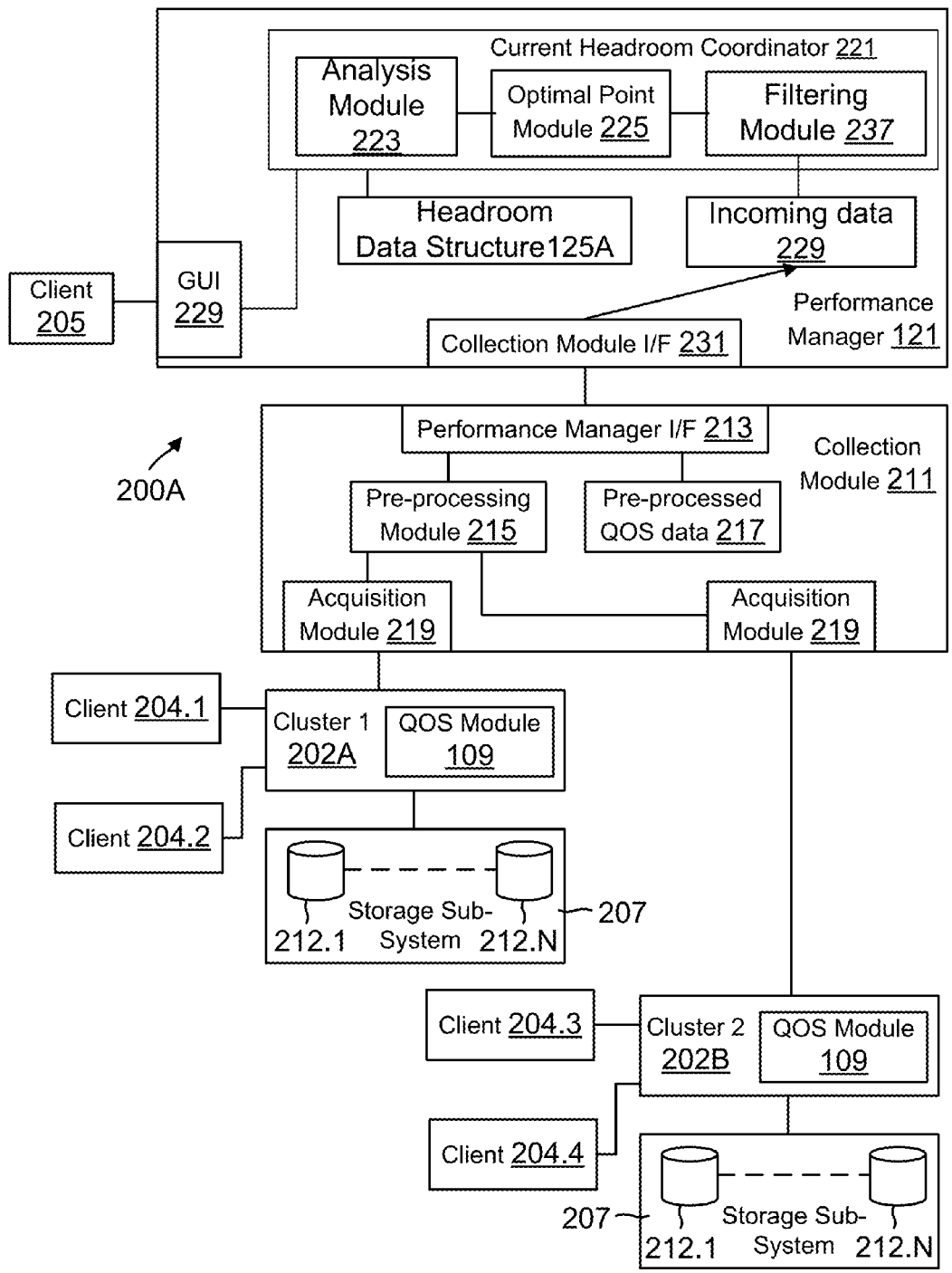
FIG. 2B shows an example of a performance manager, according to one aspect of the present disclosure.

Performance Manager 121:

FIG. 2B shows a block diagram of system 200A with details regarding performance manager 121 and a collection module 211, according to one aspect. Performance manager 121 uses the concept of workloads for tracking QOS data for managing resource usage in a networked storage environment. At a high level, workloads are defined based on incoming I/O requests and use resources within storage system 202 for processing I/O requests. A workload may include a plurality of streams, where each stream includes one or more requests. A stream may include requests from one or more clients. An example, of the workload model used by performance manager 121 is shown in FIG. 2F and described below in detail.

Performance manager 121 collects a certain amount of data (for example, data for 3 hours or 30 data samples) of workload activity. After collecting the QOS data, performance manager 121 determines the headroom for a resource, as described below in detail. Performance manager 121 uses the headroom to represent available resource capacity at any given time.

Performance manager 121 includes a current headroom coordinator 221 that includes a plurality of sub-modules including a filtering module 237, an optimal point module 225 and an analysis module 223. The filtering module 237 filters collected QOS data (shown as incoming data 229) and provides the filtered data to the optimal point module 225.

The optimal point module 225 then determines an optimal point 137 for an LvU curve. In one aspect, the optimal point module 225 determines the optimal point described below in detail.

The optimal point with the LvU curve is provided to the analysis module 223 that uses the curve and determines the headroom based on one or more operational points 135. The headroom information may be stored in a headroom data structure 125A. Details of using the filtering module 237, optimal point module 225 and the analysis module 223 are provided below.

In one aspect, the current headroom coordinator 221 and its components may be Implemented as a processor executable, application programming interface (API) which provides a set of routines, protocols, and tools for building a processor executable software application that can be executed by a computing device. When the current headroom coordinator 221 is implemented as APT, then it provides software components' in terms of its operations, inputs, outputs, and underlying types. The API may be implemented as a plug-in API which integrates headroom computation and analysis with other management applications.

When the current headroom coordinator 221 is implemented as an API, then various inputs may be provided for determining headroom. For example, inputs my include a resource identifier that identifies a resource whose performance capacity is to be computed. The outputs may headroom values, a confidence factor, and a time range for which the headroom is computed and other information.

Referring now to FIG. 2B, System 200A shows two clusters 202A and 202B, both similar to cluster 202 described above. Each cluster includes the QOS module 109 for implementing QOS policies and appropriate counters for collecting information regarding various resources. Cluster 1 202A may be accessible to clients 204.1 and 204.2, while cluster 2 202B is accessible to clients 204.3/204.4. Both clusters have access to storage subsystems 207 and storage devices 212.1/212.N.

Clusters 202A and 202B communicate with collection module 211. The collection module 211 may be a standalone computing device or integrated with performance manager 121. The aspects described herein are not limited to any particular configuration of collection module 211 and performance manager 121.

Collection module 211 includes one or more acquisition modules 219 for collecting QOS data from the clusters. The data is pre-processed by the pre-processing module 215 and stored as pre-processed QOS data 217 at a storage device (not shown). Pre-processing module 215 formats the collected QOS data for the performance manager 121. Pre-processed QOS data 217 is provided to a collection module interface 231 of the performance manager 121 via the performance manager interface 213. QOS data received from collection module 211 is stored as QOS data structure 125 (shown as incoming data 229) and used by the filtering module 237, before the data is used for computing the optimal point 137.

In one aspect, the performance manager 121 includes a GUI 229. Client 205 may access headroom analysis results using GUI 229. Before describing the various processes involving performance manager 121 and its components, the following provides an overview of QOS in general, as used by the various aspects of the present disclosure.

Figure 2C:
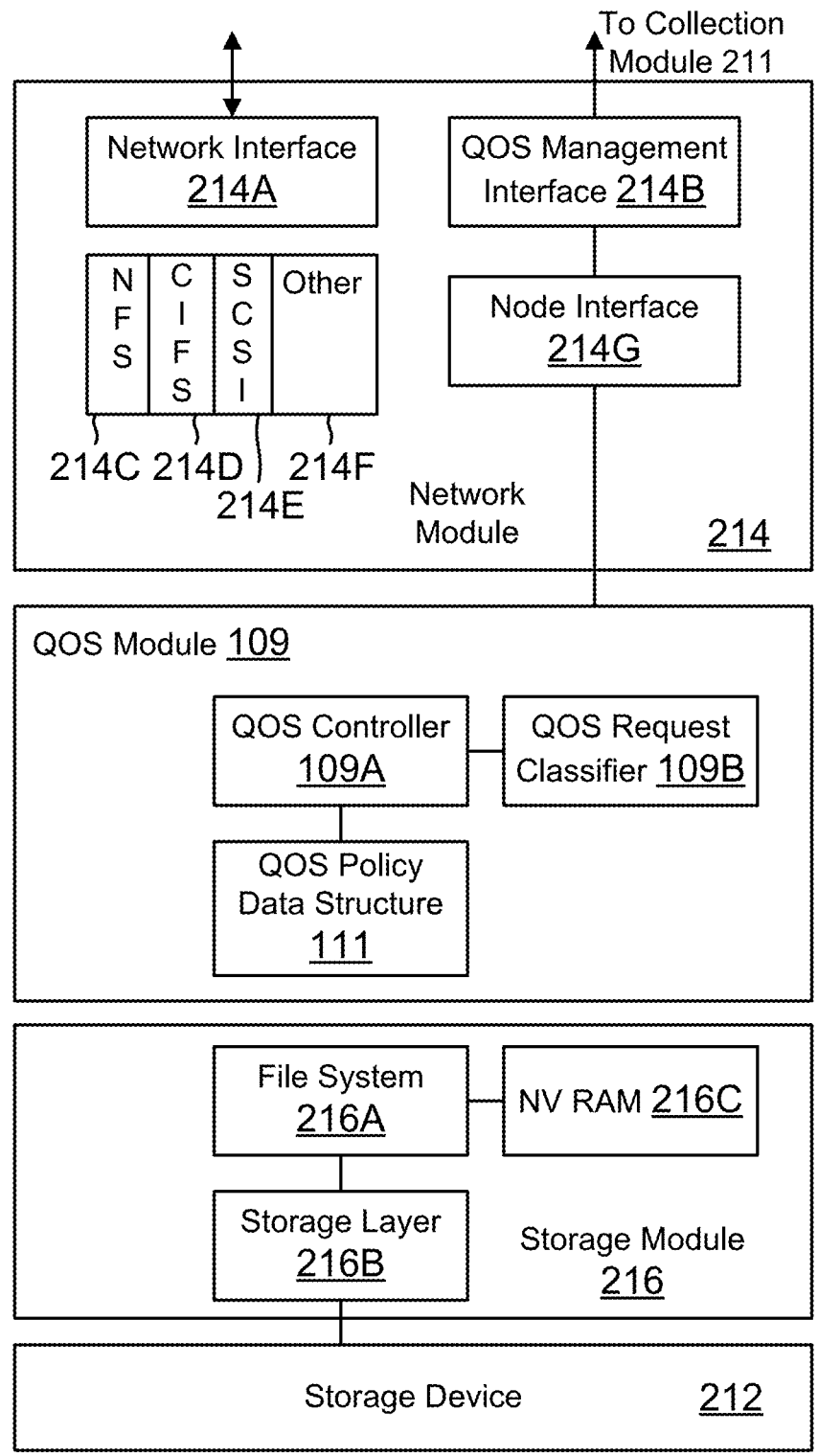
FIG. 2C shows an example of handling QOS requests by a storage system, according to one aspect of the present disclosure.

QOS Overview:

As shown in FIG. 2C, the network module 214 of a cluster includes a network interface 214A for receiving requests from clients. Network module 214 executes a NFS module 214C for handling NFS requests, a CIFS module 214D for handling CIFS requests, a SCSI module 214E for handling iSCSI requests and an others module 214F for handling "other" requests. A node interface 214G is used to communicate with QOS module 109, storage module 216 and/or another network module 214. QOS management interface 214B is used to provide QOS data from the cluster to collection module 211 for pre-processing data.

QOS module 109 includes a QOS controller 109A, a QOS request classifier 109B and QOS policy data structure (or Policy_Group) 111. The QOS policy data structure 111 stores policy level details for implementing QOS for clients and storage volumes. The policy determines what latency and throughput rate is permitted for a client as well as for specific storage volumes. The policy determines how I/O requests are processed for different volumes and clients.

The storage module 216 executes a file system 216A (a part of storage operating system 107 described below) and includes a storage layer 216B to interface with storage device 212.

NVRAM 216C of the storage module 216 may be used as a cache for responding to I/O requests. In one aspect, for executing a write request, the write data associated with the write request is first stored at a memory buffer of the storage module 216. The storage module 216 acknowledges that the write request is completed after it is stored at the memory buffer. The data is then moved from the memory buffer to the NVRAM 216C and then flushed to the storage device 212, referred to as consistency point (CP).

An I/O request arrives at network module 214 from a client or from an internal process directly to file system 216A. Internal process in this context may include a de-duplication module, a replication engine module or any other entity that needs to perform a read and/or write operation at the storage device 212. The request is sent to the QOS request classifier 109B to associate the request with a particular workload. The classifier 109B evaluates a request's attributes and looks for matches within QOS policy data structure 111. The request is assigned to a particular workload, when there is a match. If there is no match, then a default workload may be assigned.

Once the request is classified for a workload, then the request processing can be controlled. QOS controller 109A determines if a rate limit (i.e. a throughput rate) for the request has been reached. If yes, then the request is queued for later processing. If not, then the request is sent to file system 216A for further processing with a completion deadline. The completion deadline is tagged with a message for the request.

File system 216A determines how queued requests should be processed based on completion deadlines. The last stage of QOS control for processing the request occurs at the physical storage device level. This could be based on latency with respect to storage device 212 or overall node capacity/utilization as described below in detail.

Figure 2D:
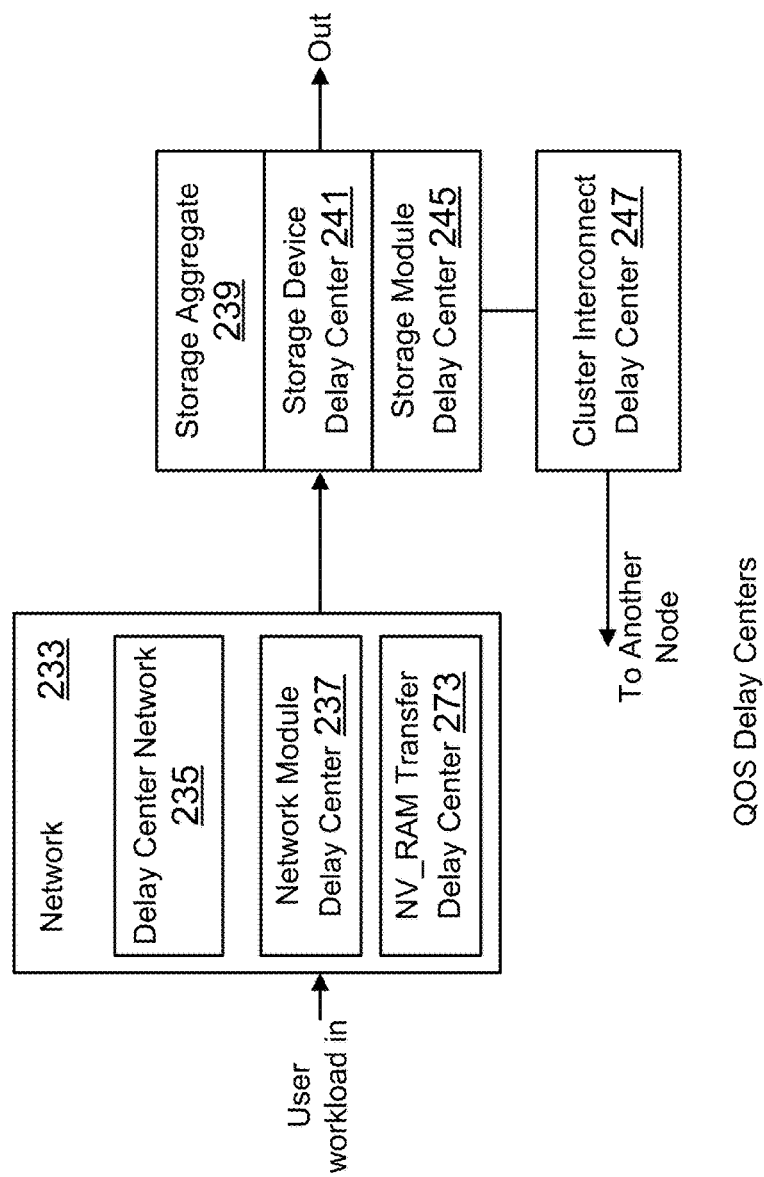
FIG. 2D shows an example of a resource layout used by the performance manager, according to one aspect of the present disclosure.

Performance Model:

FIG. 2D shows an example of a queuing structure used by the performance manager 121 for determining headroom, according to one aspect. A user workload enters the queuing network from one end (i.e. at 233) and leaves at the other end.

Various resources are used to process I/O requests. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, the QOS data includes a number of visits, wait time per visit and service time per visit for incident detection and analysis. For the delay center, only the number of visits and the wait time per visit at the delay center are used, as described below in detail.

Performance manager 121 uses different flow types for its analysis. A flow type is a logical view for modeling request processing from a particular viewpoint. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

Referring now to FIG. 2D, delay center network 235 is a resource queue that is used to track wait time due to external networks. Storage operating system 107 often makes calls to external entities to wait on something before a request can proceed. Delay center 235 tracks this wait time using a counter (not shown).

Network module delay center 237 is another resource queue where I/O requests wait for protocol processing by a network module processor. This delay center 237 is used to track the utilization/capacity of the network module 216. Overutilization of this resource may cause latency, as described below in detail.

NV_RAM transfer delay center 273 is used to track how the non-volatile memory may be used by cluster nodes to store write data before, the data is written to storage devices 212, in one aspect, as described below in detail.

A storage aggregate (or aggregate) 239 is a resource that may include more than one storage device for reading and writing information. Aggregate 239 is tracked to determine if the aggregate is fragmented and/or over utilized, as described below in detail.

Storage device delay center 241 may be used to track the utilization of storage devices 212. In one aspect, storage device utilization is based on how busy a storage device may be in responding to I/O requests.

In one aspect, storage module delay center 245 is used for tracking node utilization. Delay center 245 is tracked to monitor the idle time for a CPU used by the storage module 216, the ratio of sequential and parallel operations executed by the CPU and a ratio of write duration and flushing duration for using NVRAM 216C or an NVRAM at the storage module (not shown).

Nodes within a cluster communicate with each other. These may cause delays in processing I/O requests. The cluster interconnect delay center 247 is used to track the wait time for transfers using the cluster interconnect system. As an example, a single queue maybe used to track delays due to cluster interconnects.

There may also be delay centers due to certain internal processes of storage operating system 107 and various queues may be used to track those delays. For example, a queue may be used to track the wait for I/O requests that may be blocked for file system reasons. Another queue (Delay_Center_Susp_CP) may be used to represent the wait time for Consistency Point (CP) related to the file system 216A. During a CP, write requests are written in bulk at storage devices and this will typically cause other write requests to be blocked so that certain buffers are cleared.

Figure 2E:
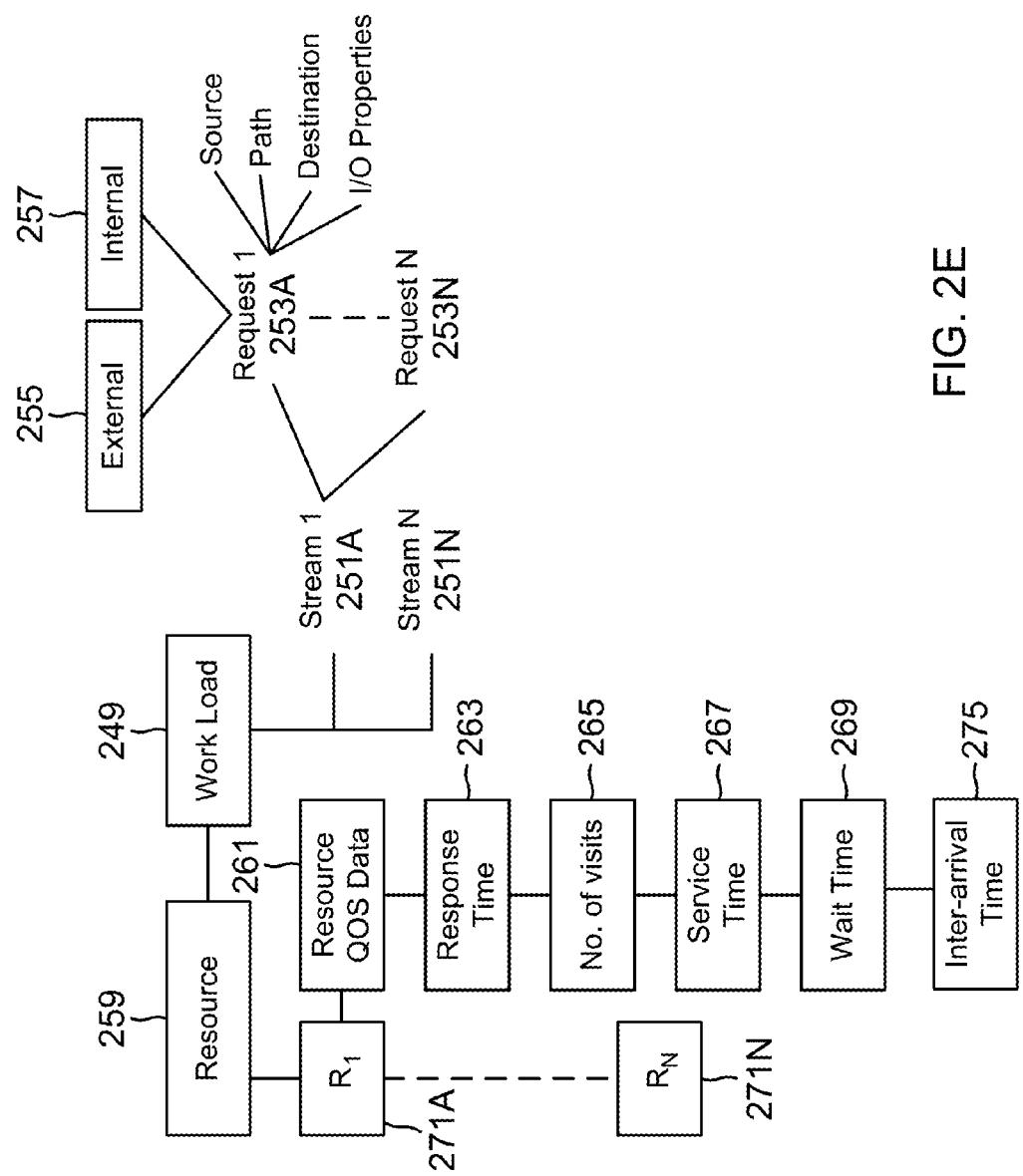
FIG. 2E shows an example of managing workloads and resources by the performance manager, according to one aspect of the present disclosure.

Workload Model:

FIG. 2E shows an example, of the workload model used by performance manager 121, according to one aspect. As an example, a workload may include a plurality of streams 251A-251N. Each stream may have a plurality of requests 253A-253N. The requests may be generated by any entity, for example, an external entity 255, like a client system and/or an internal entity 257, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol. A destination is the target of a request, for example, storage volumes, LUNs, data containers and others.

I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload. Furthermore, requests that fall into a workload are tracked together by performance 121 for efficiency. Any requests that don't match a user or system defined workload may be assigned to a default workload.

In one aspect, workload streams may be defined based on the I/O attributes. The attributes may be defined by clients. Based on the stream definition, performance manager 121 tracks workloads, as described below.

Referring back to FIG. 2E, a workload uses one or more resources for processing I/O requests shown as 271A-271N as part of a resource object 259. The resources include service centers and delay centers that have been described above with respect to FIG. 2D. For each resource, a counter/queue is maintained for tracking different statistics (or QOS data) 261. For example, a response time 263, and a number of visits 265, a service time (for service centers) 267, a wait time 269 and inter-arrival time 275 are tracked. Inter-arrival time 275 is used to track when an I/O request for reading or writing data is received at a resource. The term QOS data as used throughout this specification includes one or more of 263, 265, 267 and 269 according to one aspect.

Performance manager 121 may use a plurality of counter objects for resource monitoring and headroom analysis, according to one aspect. Without limiting the various adaptive aspects, an example of the various counter objects are shown and described in Table I below:

TABLE I

| Workload Object Counters | Description |
| --- | --- |
| OPS | A number of workload operations that are completed during a measurement interval, for example, a second. |
| Read_ops | A number of workload read operations that are completed during the measurement interval. |
| Write_ops | A number of workload write operations that are completed during the measurement interval. |
| Total_data | Total data read and written per second by a workload. |
| Read_data | The data read per second by a workload. |
| Write_data | The data written per second by a workload. |
| Latency | The average response time for I/O requests that were initiated by a workload. |
| Read_latency | The average response time for read requests that were initiated by a workload. |
| Write_latency | The average response time for write requests that were initiated by a workload. |
| Classified | Requests that were classified as part of a workload. |
| Read_IO_type | The percentage of reads served from various components (for example, buffer cache, ext_cache or disk). |
| Concurrency | Average number of concurrent requests for a workload. |
| Interarrival_time_sum_squares | Sum of the squares of the Inter-arrival time for requests of a workload. |

Without limiting the various aspects of the present disclosure, Table II below provides an example of the details associated with the object counters that are monitored by the performance manager 121, according to one aspect:

TABLE II

| Workload Detail Object Counter | Description |
| --- | --- |
| Visits | A number of visits to a physical resource per second; this value is grouped by a service center. |
| Service_Time | A workload's average service time per visit to the service center. |
| Wait_Time | A workload's average wait time per visit to the service center. |

Figure 3A:
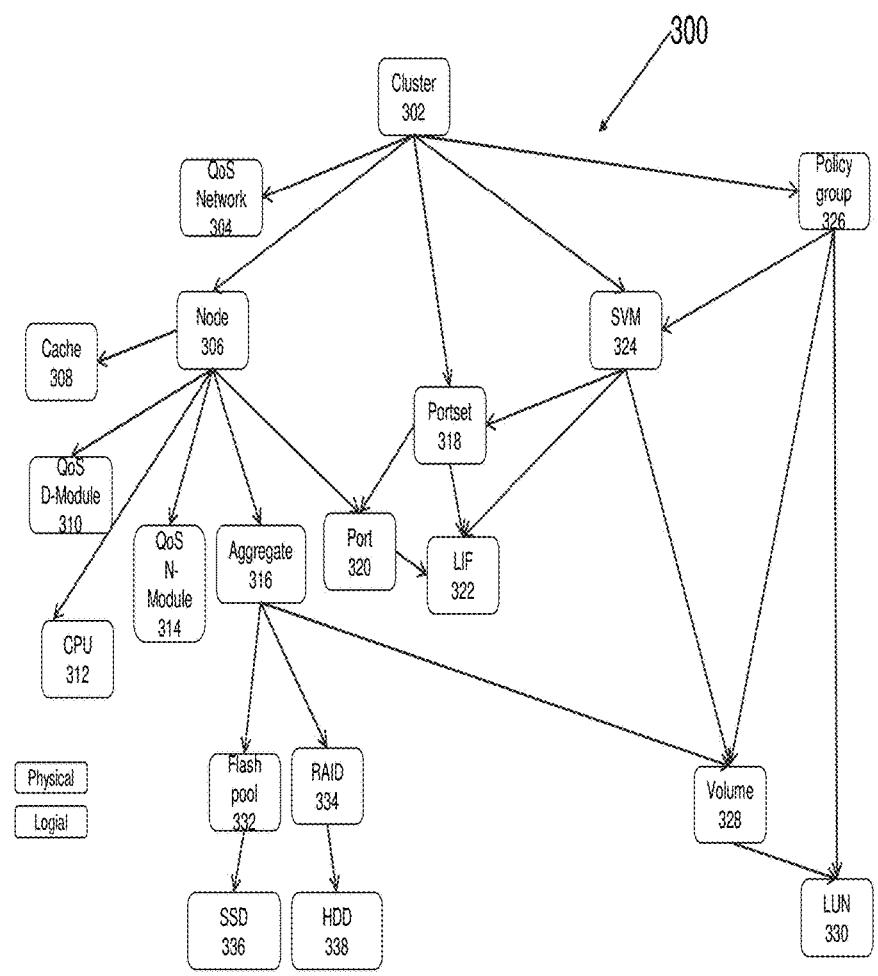
FIG. 3A shows a format for managing various resource objects, according to one aspect of the present disclosure.

Object Hierarchy:

FIG. 3A shows an example of a format 300 for tracking information regarding different resources that are used within a clustered storage system (for example, 202, FIG. 2A). Each resource is identified by a unique resource identifier value that is maintained by the performance manager 121. The resource identifier value may be used to obtain available performance capacity (headroom) of a resource.

Format 300 maybe hierarchical in nature where various objects may have parent-child, peer and remote peer relationships, as described below. As an example, format 300 shows a cluster object 302 that may be categorized as a root object type for tracking cluster level resources. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module 314, a CPU object 312 and an aggregate object 316.

The cache object 308 is used to track utilization/latency of a cache (for example, NVRAM 216C, FIG. 2D). The QOS storage module 310 tracks the QOS of a storage module defined by a QOS policy data structure 111 described above in detail with respect to FIG. 2D. The QOS network module object 314 tracks the QOS for a network module. The CPU object 312 is used to track CPU performance and utilization of a node.

The aggregate object 316 tracks the utilization/latency of a storage aggregate that is managed by a cluster node. The aggregate object may have various child objects, for example, a flash pool object 332 that tracks usage of a plurality of flash based storage devices (shown as "flash pool"). The flash pool object 332 may have a SSD disk object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a LIF object 322. The LIF object 322 includes a logical interface, for example, an IP address, while the port object 320 includes a port identifier for a port, for example, a worldwide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (read, write or read and write) and other information.

Figure 3B:
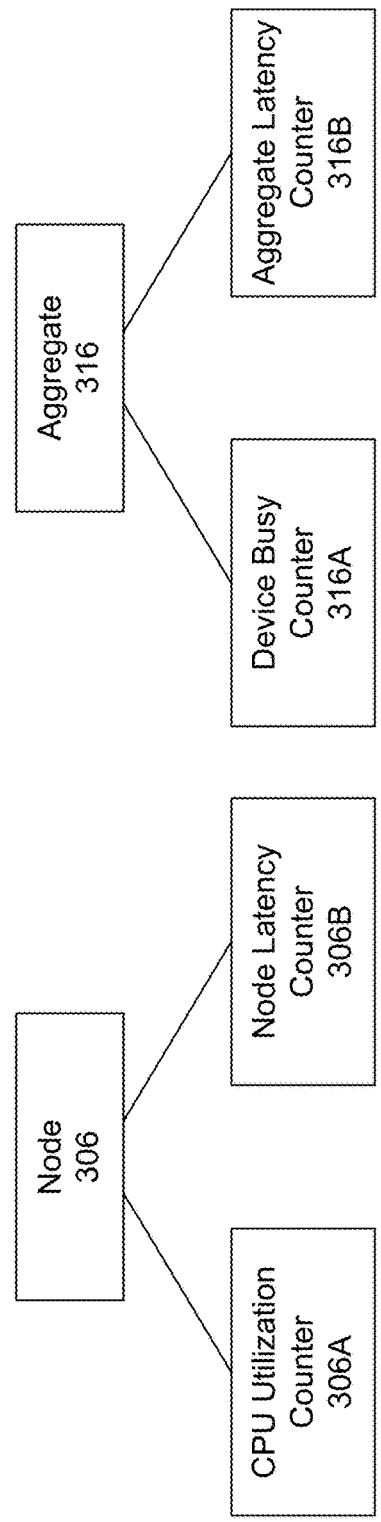
FIG. 3B shows an example of certain counters that are used, according to one aspect of the present disclosure.

FIG. 3B shows an example of some additional counters that are used for headroom analysis, described below in detail. These counters are related to nodes and aggregates and are in addition to the counters of Table I described above. For example, counter 306A is used to track the utilization i.e. idle time for each node processor. Node latency counter 306B tracks the latency at the nodes based on operation types, i.e. read and write operations. The latency may be based on the total number of visits at a storage system node/number of operations per second for a workload. This value may not include internal or system default workloads, as described below in detail.

Aggregate utilization is tracked using counter 316A that tracks the duration of how busy a device may be for processing user requests. An aggregate latency counter 316B tracks the latency due to the storage devices within an aggregate. The latency may be based on a measured delay for each storage device in an aggregate. The use of these counters for headroom analysis is described below in detail.

Figure 4A:
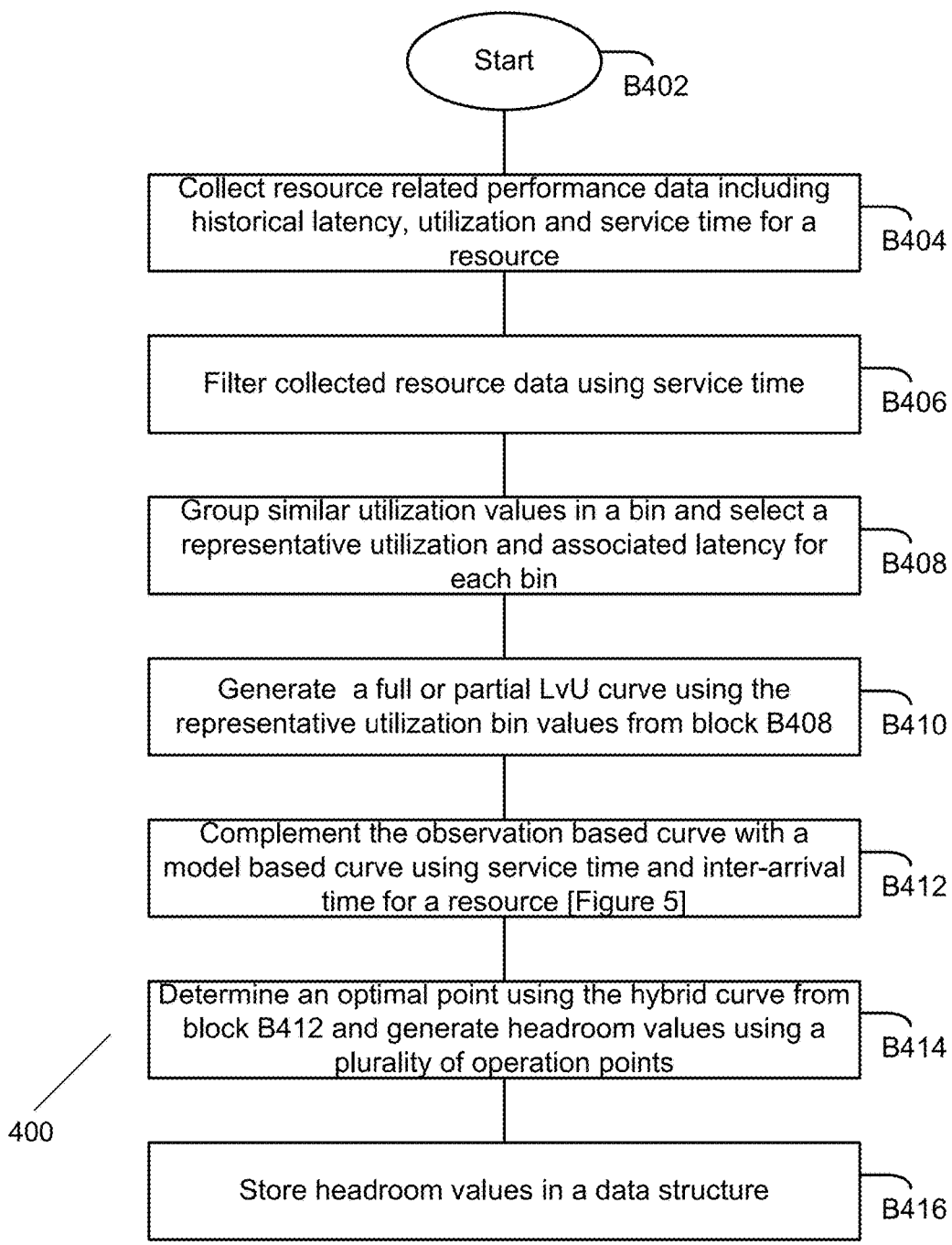
FIG. 4A shows an example of a process flow for determining and analyzing headroom using a hybrid approach, according to one aspect of the present disclosure.

Headroom Computation and Analysis:

FIG. 4A shows an overall machine implemented, hybrid process flow 400 for determining and analyzing headroom, according to one aspect of the present disclosure. The hybrid process generates a partial curve using observed values and then augments the partial curve with a model based LvU curve determined using the process of FIG. 5. The hybrid process is efficient compared to the conventional processes that select between a model based or an observation based LvU curve depending on a confidence factor for each curve. Determining the confidence factor can be resource intensive and undesirable. Process 400 does not have to use the confidence factor and instead uses a hybrid approach, described below in detail.

The various process blocks may be executed by performance manager 121. It is noteworthy that the process blocks may be executed by processor executable application programming interface (APIs) that may be made available at a management console or any computing device.

The process begins in block B402, when the storage system 108 is operational and data has been stored at the storage devices.

In block B404, performance data (for example, latency, utilization and service time) for a resource, for example, the cluster nodes and aggregates has been collected. The collected data is provided to the performance manager 121. In one aspect, historical QOS data is also accessed by the performance manager 121 for headroom analysis. The performance manager 121 also obtains information regarding any events that may have occurred at the storage system level associated with the QOS data. Any policy information that is associated with the resource for which the QOS data is also obtained by the performance manager 121.

In block B406, the filtering module 237 filters the collected data for a resource identified by a resource identifier. In one aspect, observations that are beyond a certain percentage of the service time are ignored. For example, all latency and utilization values for which the service time is within 10% are kept and others are considered as outliers and hence ignored.

Figure 6A:
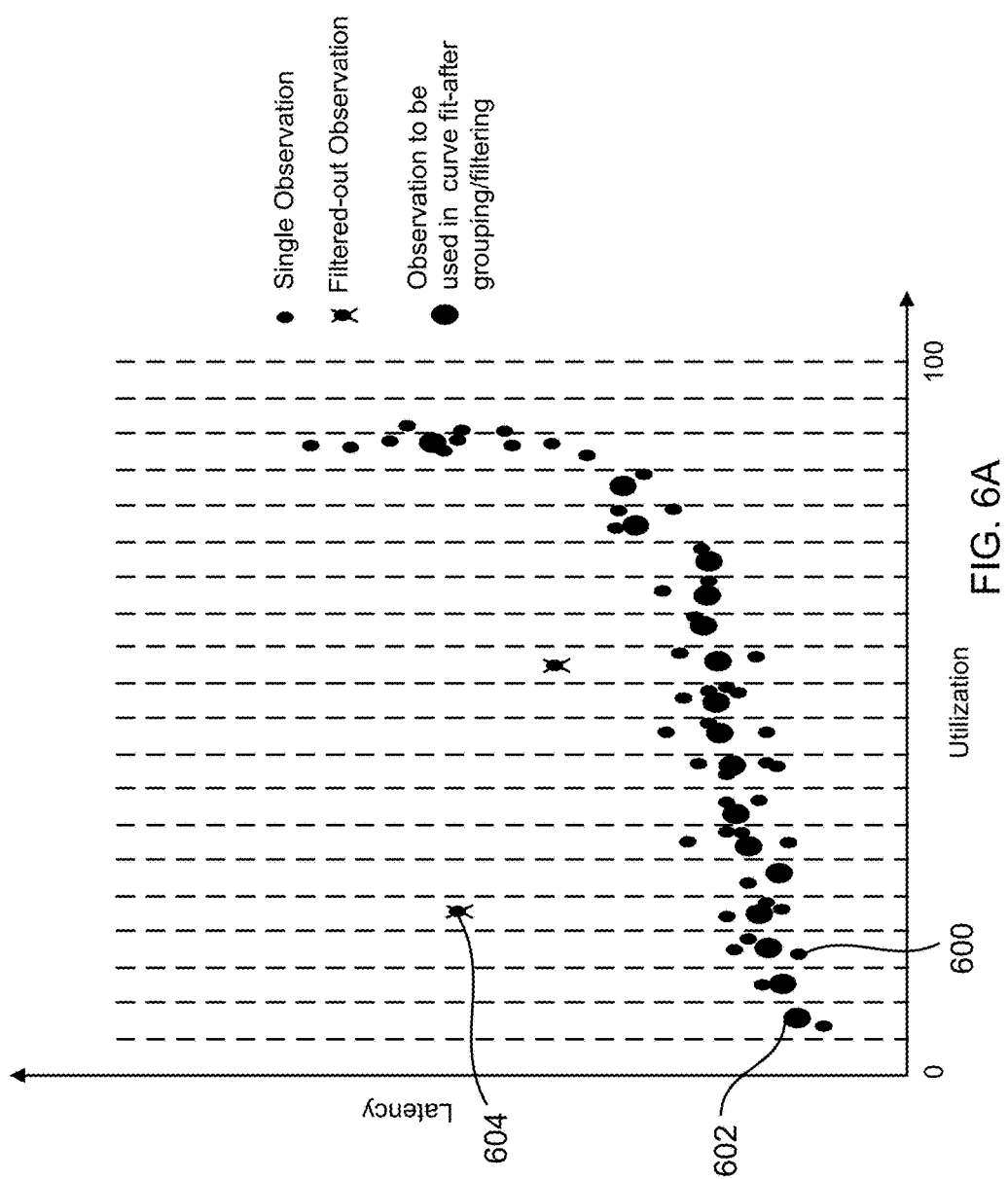
FIG. 6A shows a graphical illustration of filtering data in block B408 of FIG. 4A, according to one aspect of the present disclosure.

Using the filtered data, in block B408, similar utilization values are grouped into "bins", where each bin has a plurality of similar utilization values. A representative value for each bin is identified. In one aspect, a mode of the various bin values is selected as the representative value. This is graphically illustrated in FIG. 6A where all the collected individual observations are shown as 600, the filtered representative values are shown as 602 and the discarded values are shown as 604.

In one aspect, filtering module 237 may also insert missing data, according to one aspect. For example, service times for different resources are expected to be within a range based on collected historical service time data. If the collected data have a high coefficient of variation, then the collected data may not be reliable and hence may have to be corrected.

After the data is filtered and grouped, in block B410, a first portion of a hybrid LvU curve is generated using an observation based technique with representative observation bin values from block B408. The first portion of the hybrid curve or the completeness of the hybrid curve will depend on the number of observations that are available at any given time.

Figure 5:
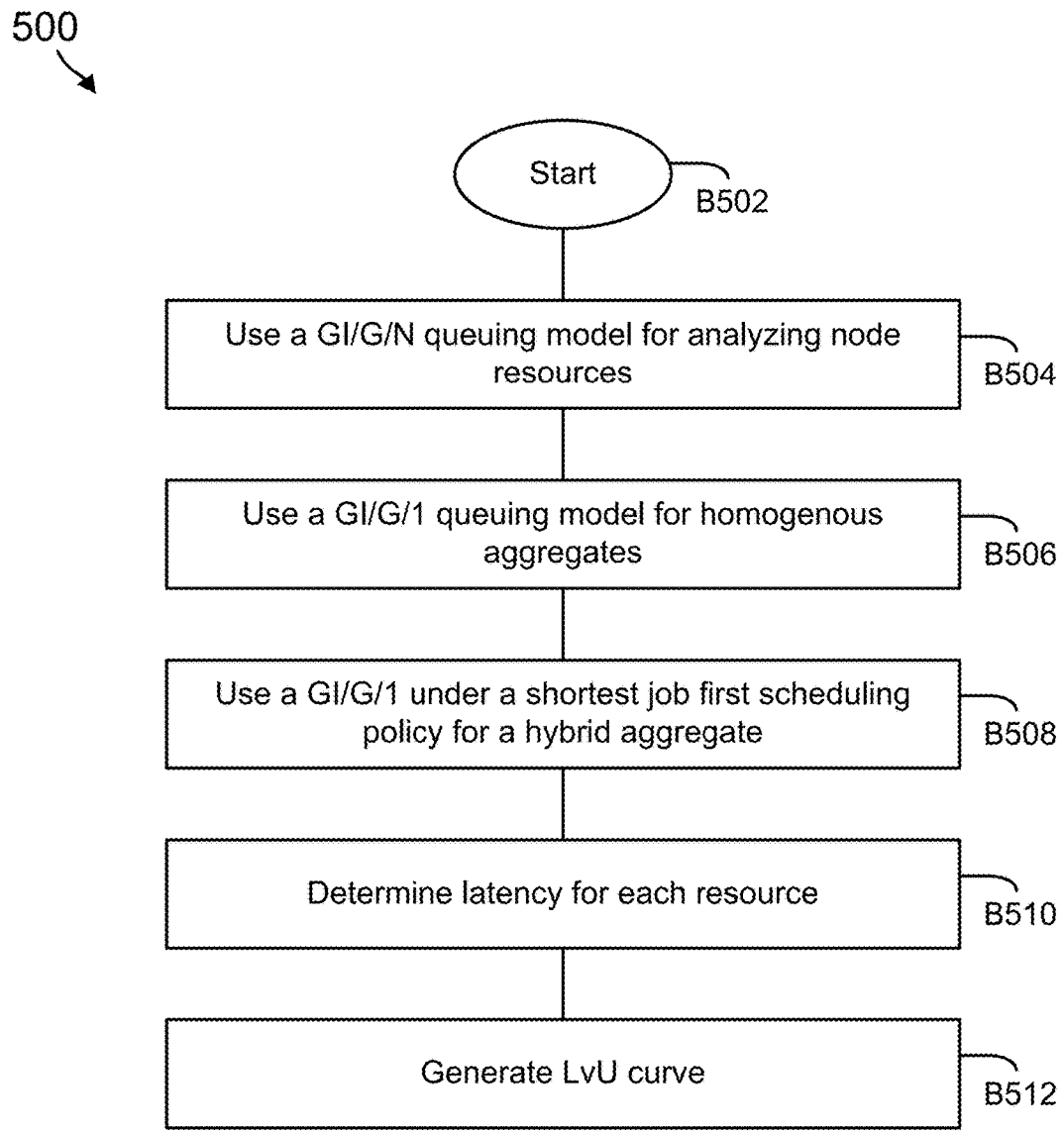
FIG. 5 shows a process flow for determining an optimal point using a model based technique; according to one aspect of the present disclosure.

The first portion of the hybrid curve may be complemented in block B412, by a model based curve (also referred to as the second portion of the hybrid curve) generated using a model based technique that is shown in FIG. 5 and described below in detail. Briefly, the model based technique uses only current observations and queueing models to generate the second portion of the hybrid LvU curve. The model based technique uses inter-arrival times and service times for a resource. The inter-arrival times track the arrival times for I/O requests at a resource, while the service times track the duration for servicing user based I/O requests.

Figure 6B:
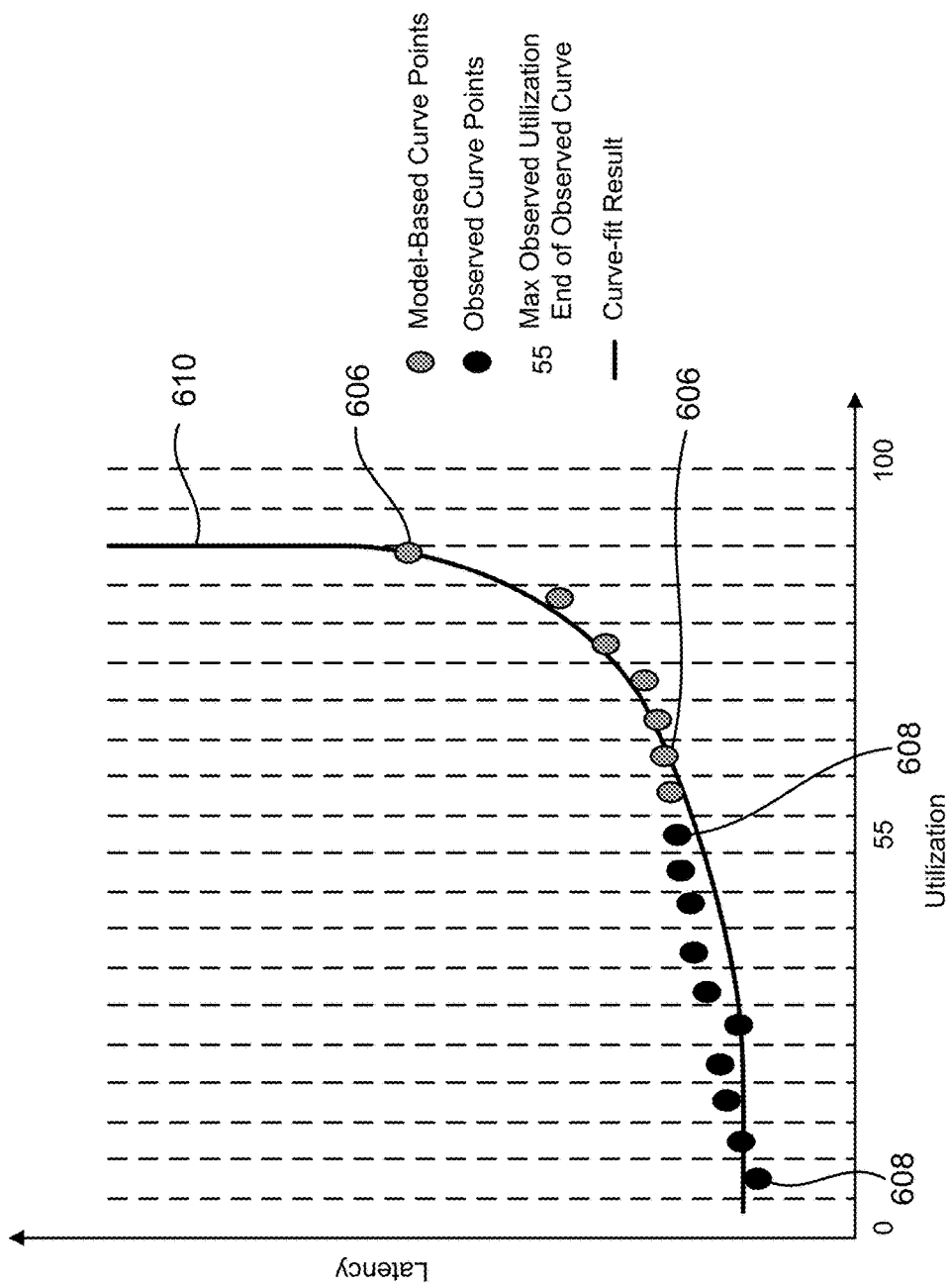
FIG. 6B shows a graphical illustration of generating a LvU curve using the hybrid process, according to one aspect of the present disclosure.

FIG. 6B shows a first portion of a hybrid curve 610 that is generated using observation based values 608. A plurality of model based points 606 are used to complement the first portion i.e. a partial observation based LvU curve. The complete hybrid curve is shown in FIG. 6B as 610.

Figure 4B:
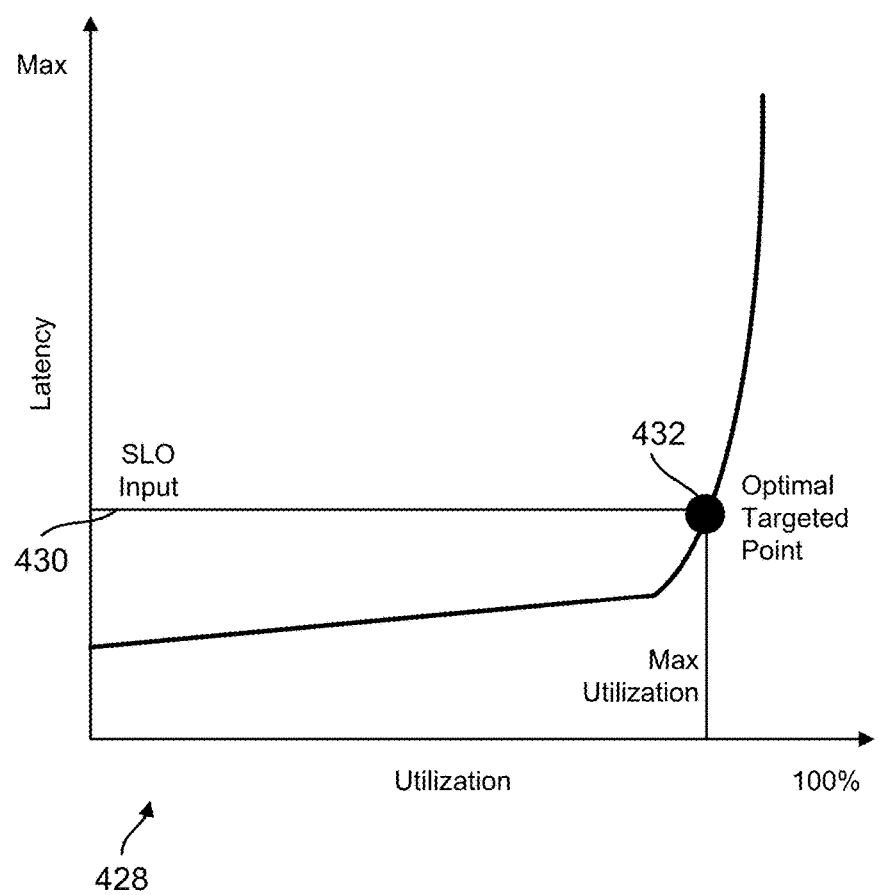
FIG. 4B shows an example of using a custom operational point for a LvU curve, according to one aspect of the present disclosure.

In block B414, an optimal point is selected. This information may be provided to the analysis module 223 or ascertained by the analysis module 223. In another aspect, the optimal point may be based on a policy. FIG. 4B shows an example of a LvU curve 428 that is generated using the process of FIG. 4A, which uses a SLO input (for example, from a policy) 430. The SLO input defines a latency limit/maximum utilization that is assigned for user/resource. The custom optimal point is determined by the intersection of the SLO input and the LvU curve, shown as 432.

Figure 4C:
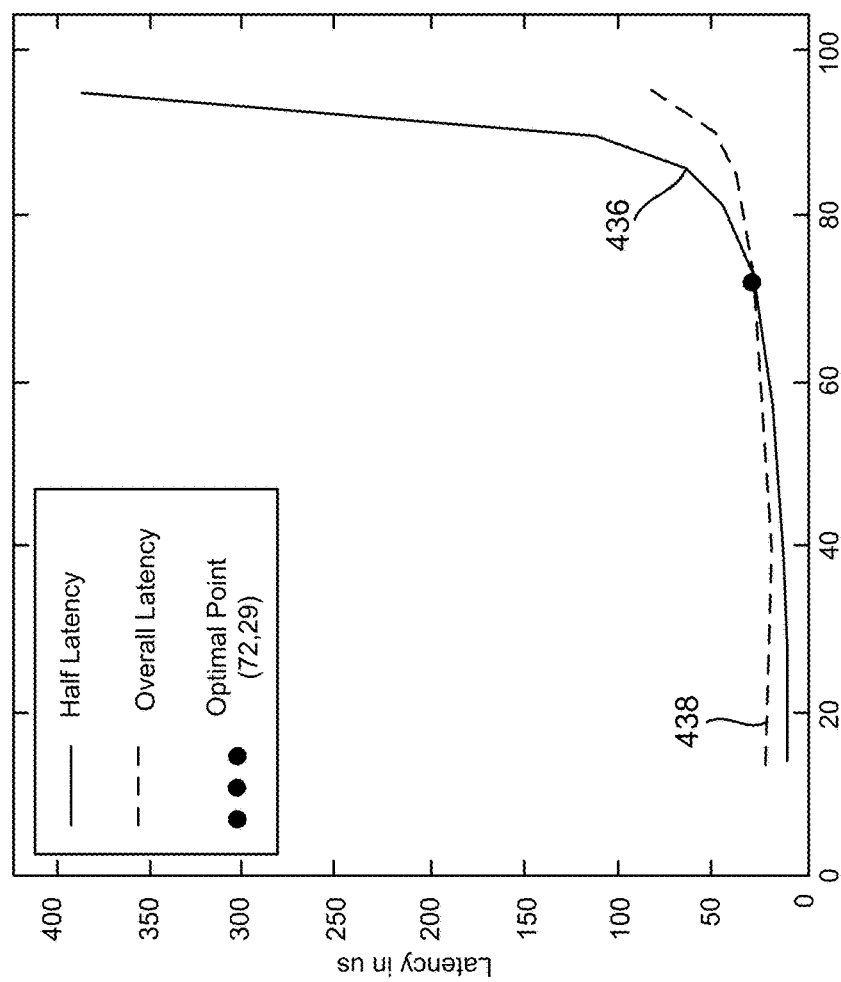
FIG. 4C shows an example determining an operational point, according to one aspect of the present disclosure.

FIG. 4C shows an example 434 for identifying the optimal point using the "point of diminishing returns" approach. In FIG. 4C the intersection of a half latency v utilization curve 436 and the overall latency curve 438 may be identified as the optimal point.

In block B414, the analysis module 223 also determines the headroom (for example, 139, FIG. 1A) using the optimal point and an operational point. In one aspect, different operational points may be used for a resource based on the operating environment and how the resources are being used. For example, a current total utilization may be used as an operational point with the presumption that the current total utilization may be used to process a workload mix. As described above, a workload mix represents all user workloads utilizing one or more resources. This provides a sampled headroom for a resource.

In another aspect, a custom operational point may be used when a volume is identified in a policy. In another aspect, the analysis module 223 may ascertain the effect of moving workloads which may affect utilization and the operational point. In yet another aspect, the utilization of a node pair that are configured as high availability (HA) pair nodes is considered for the operational point. When nodes operate as HA pair nodes and if one of the nodes becomes unavailable, then the other node takes over workload processing. In this instance, latency/utilization of both the nodes is used for determining the operational point and computing the headroom. This headroom analysis is referred to as the actual headroom.

Referring back to FIG. 4A, in block B416, the plurality of headroom values are stored at data structure 125A and may also be presented to the user. Headroom information stored at headroom data structure 125A may include the following fields that are described in Table III below:

TABLE III

| Columns | Description |
|---|---|
| Resource metadata | This field identifies the resource whose sampled headroom is being stored at data structure 125A |
| Index counter data | This field provides key identifiers for a workload mix e.g. service time, utilization, latency |
| Time counters | Sample time |
| Operational Points | Operational Point - Entire workload mix |
| | Operational Point - HA Node pairs |
| | Operational Point - Internal throttled workloads |
| | Operational Point - Custom based on SLO |
| Headroom Values | Sampled headroom |
| | Actual headroom - HA Node pairs |
| | Actual headroom - (HA + Internal throttled workloads) |
| | Actual headroom - Custom |

In one aspect, headroom data structure 125A may be used for future analysis and historical comparison. Data structure 125A may also be made available to APIs that are used by third-party or client systems that are monitoring a resource using a management application (for example, 117, FIG. 1A).

The process of FIG. 4A provides a method for filtering performance data associated with a resource used in a networked storage environment for reading and writing data at a storage device; and then determining available performance capacity of the resource using the filtered performance data. The available performance capacity is based on optimum utilization of the resource and actual utilization of the resource, where utilization of the resource is an indicator of an extent the resource is being used at any given time, the optimum utilization is an indicator of resource utilization beyond which throughput gains for a workload is smaller than increase in latency and latency is an indicator of delay at the resource in processing the workload.

Model Based Process for Generating LvU Curve:

FIG. 5 shows a process 500 for generating the second portion of the hybrid curve 610 using a model-based technique for block B412 of FIG. 4A, according to one aspect. The model based technique begins in block B502. The model based technique uses analytic models with inter-arrival times at the resources (average and variance) as well as the service times (average and variance) for each resource to process a workload mix. A queueing model is used for evaluating each resource in the networked storage environment. As an example, each resource may be modelled as a GI/G/I queue such that that a service center where requests arrive according to a general independent stochastic process and are served according to a general stochastic process by a single node, according to FCFC (First Come, First Served) methodology. If the service center includes N node resources, then the queueing model is GI/G/n. In one aspect, I/O request arrivals and service at a resources are parameterized at any given time. In one aspect, as described below, different queuing models are used for different resources.

In block B504, the analysis module 223/optimal point module 225 uses the GI/G/N (where N is the number of cores that act as servers in the queuing model) for node resources, for example, a multi-core CPU of a node.

In block B506, SSD and hard drive aggregates are queued under GI/G/1 model by the analysis module 223/optimal point module 225 because in an aggregate, the I/O requests are expected to be uniformly served by all the storage devices in the aggregate and hence GI/G/1 is an accurate representation.

When an aggregate is a hybrid aggregate i.e. includes both SSD and hard drives, then a GI/G/1 queueing model under the shortest job first (SJF) scheduling policy is used in block B508 by the optimal point module 225. The reason for using this model is because in hybrid aggregates, the service time may be variable since some I/O requests are served at a faster rate while others at a lower rate.

In block B510, the estimated latency is determined by the optimal point module 225 for each resource using the inter-arrival time and service time. The latency may be expressed as $T_r$. In one aspect, Kingman's formula for GI/G/1 queues maybe used to estimate $T_r$ of the resource based on the equation provided below:

$$T_r = T_s + \frac{\rho T_s(c_a^2 + c_s^2)}{2(1-\rho)}. \qquad (1)$$

$T_s$ is the expected service time at the resource
$\rho$ is the current utilization in the resource
$c_a^2$ and $c_s^2$ are the squared coefficient of variations (CV) for inter-arrival times and service times at the resource, respectively.

Kingman's formula is an approximation for the GI/G/1 queues. And hence a correction factor $G_{KLB}$ may be used for correcting the expected latency defined by equation [2] below:

$$G_{KLB} = \begin{cases} \exp\left(\frac{2}{3} \cdot \frac{1-\rho}{P_n} \cdot \frac{(1-c_a^2)^2}{c_a^2+c_s^2}\right), & 0 \le c_a^2 \le 1 \\ \exp\left(-(1-\rho)\frac{c_a^2-1}{c_a^2+c_s^2}\right), & c_a^2 > 1 \end{cases} \qquad (2)$$

The incorporation of $G_{KLB}$ modifies the Kingman formula as:

$$T_r = T_s + \frac{\rho T_s(c_a^2 + c_s^2)}{2(1-\rho)} G_{KLB}. \qquad (3)$$

which tend to return lower latency values compared to (1).

Latency in a GI/G/1/SJF (Shortest Job First) queue the latency is determined by:

$$T_r(x) = T_s + \frac{\rho(x) T_s(c_a^2 + c_s^2)}{2(1-\rho(x))} G_{KLB}$$

Where x is a specific service time in the full range $[s_{min}, s_{max}]$ of the service times at the resource and $$\rho(x) = \rho T_s \int_{s_{min}}^{x} tf(t)dt$$

In the case of multiple servers the latency formula (3) described above is modified as $$T_r = T_s + \frac{P_n T_s (c_a^2 + c_s^2)}{2n(1-\rho)} G_{KLB},$$

Where n is the number of servers and $$P_n = \frac{(n\rho)^n}{n!(1-\rho)} \cdot \left[ \sum_{k=0}^{n-1} \frac{(m\rho)^k}{k!} + \frac{(n\rho)^n}{n!(1-\rho)} \right]^{-1}.$$

It is noteworthy that $P_n$ is an estimation of the effective utilization in the system with n servers. The queuing system is not considered busy until all servers are busy. This is captured by expressing business as a function of the number of servers being utilized (one component in $P_n$ for each possible busy servers).

At each node resource there may be three traffic types: high priority, low priority and CP operations. The accuracy of the models depends how these three traffic types are interleaved to generate the final queuing model. If we assume the traffic at the storage module is managed according to priority levels of these types, the latency of high priority traffic, may be determined by [1]:

$$T_{r,1} = T_{s,1} + \frac{P_n}{2n(1-\rho)\rho} \sum_{i=1}^{N} \rho_i T_{s,i} (c_{a,i}^2 + c_{s,i}^2) G_{KLB}.$$

Here the summation is over N levels of priorities and the subscript i refers to parameters of that type of traffic. Note that i=1 refers to high priority traffic.

In another aspect, all types of traffic maybe combined into a single stream without any batching or priority assumptions. In that case the resulting variance when three types of traffic is mixed is given by:

$$\sigma_{mix}^2 = \frac{n_1}{n_1+n_2+n_3}(\sigma_1^2 + (\mu_{mix} - \mu_1)^2) + \frac{n_2}{n_1+n_2+n_3}(\sigma_2^2 + (\mu_{mix} - \mu_2)^2) \frac{n_3}{n_1+n_2+n_3}(\sigma_3^2 + (\mu_{mix} - \mu_3)^2),$$

where $n_1$ and $\mu_1$ are the sample size and the mean of each traffic type and $$\mu_{mix} = \frac{n_1}{n_1+n_2+n_3}\mu_1 + \frac{n_2}{n_1+n_2+n_3}\mu_2 + \frac{n_3}{n_1+n_2+n_3}\mu_3.$$

Once the variance and the mean of the inter-arrival times (or service times) the coefficient of variation associated with each process is computed and used within the GI/G/1 GI/G/n queuing formulas described above. If the variances are large and undesirable, the sample sizes $n_2$ and $n_3$, which correspond to low priority and CP traffic may be reduced by:

$$n_i = n_i \frac{n_i}{n_1+n_2+n_3}$$

Once the latency is determined by the optimal point module 225 using the foregoing models, in block B512, the analysis model 223 generates the model based LvU curve to augment the first portion of the hybrid LvU curve described above in detail with respect to FIG. 4A.

Figure 7:
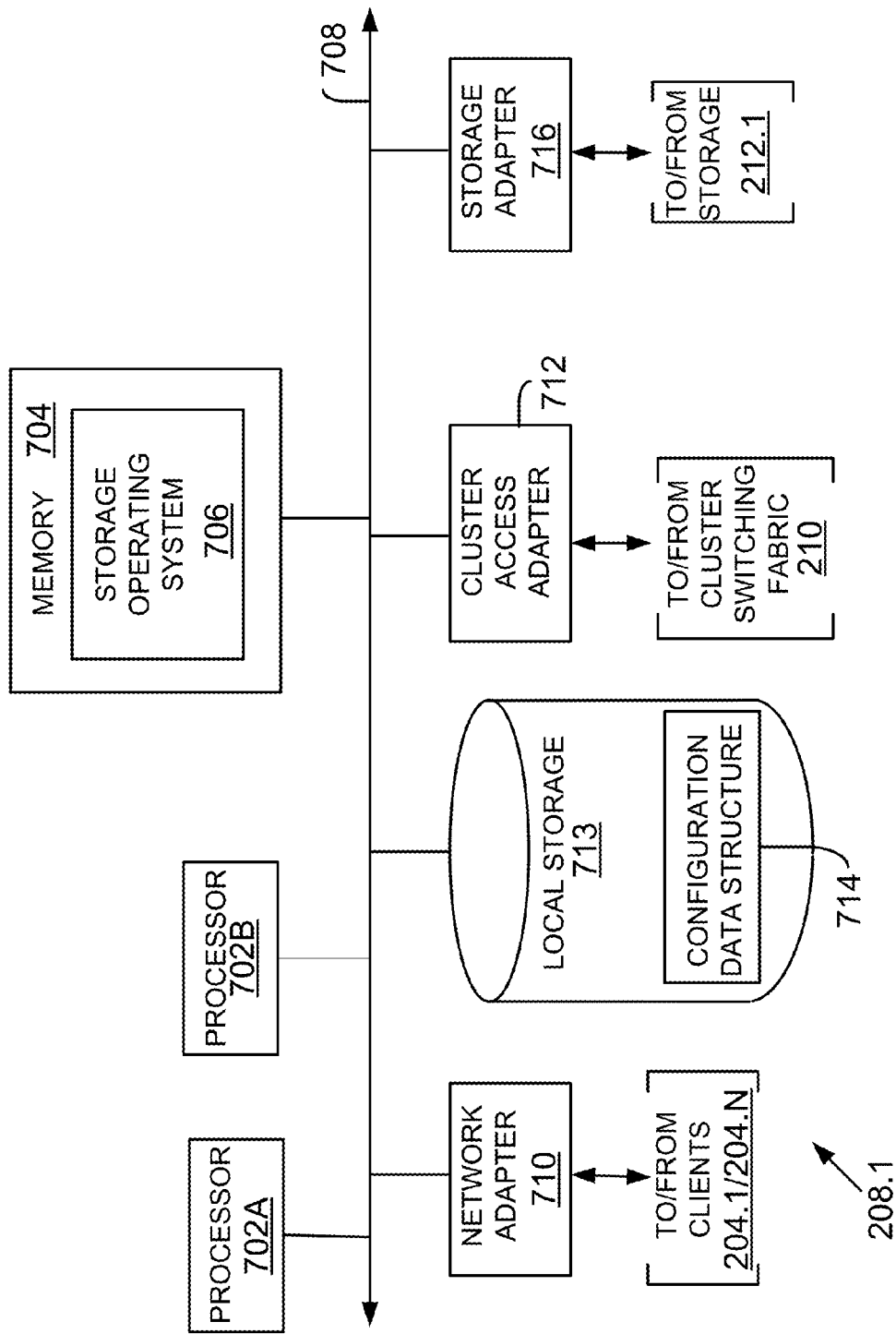
FIG. 7 shows an example of a storage system, used according to one aspect of the present disclosure.

Storage System Node:

FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 713 interconnected by a system bus 708. Node 208.1 is used as a resource and may be used to provide node and storage utilization information to performance manager 121 described above in detail.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Idle time for processors 702A-702A is tracked by counters 306A, described above in detail.

The local storage 713 comprises one or more storage devices utilized by the node to locally store configuration information for example, in a configuration data structure 714. The configuration information may include information regarding storage volumes and the QOS associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing a storage operating system 706 (similar to 107, FIG. 1B) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 706 portions of which is typically resident in memory and executed by the processing elements, functionally organizes the node 208.1 by, inter alia, invoking storage operation in support of the storage service implemented by the node.

In one aspect, data that needs to be written is first stored at a buffer location of memory 704. Once the buffer is written, the storage operating system acknowledges the write request. The written data is moved to NVRAM storage and then stored persistently.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
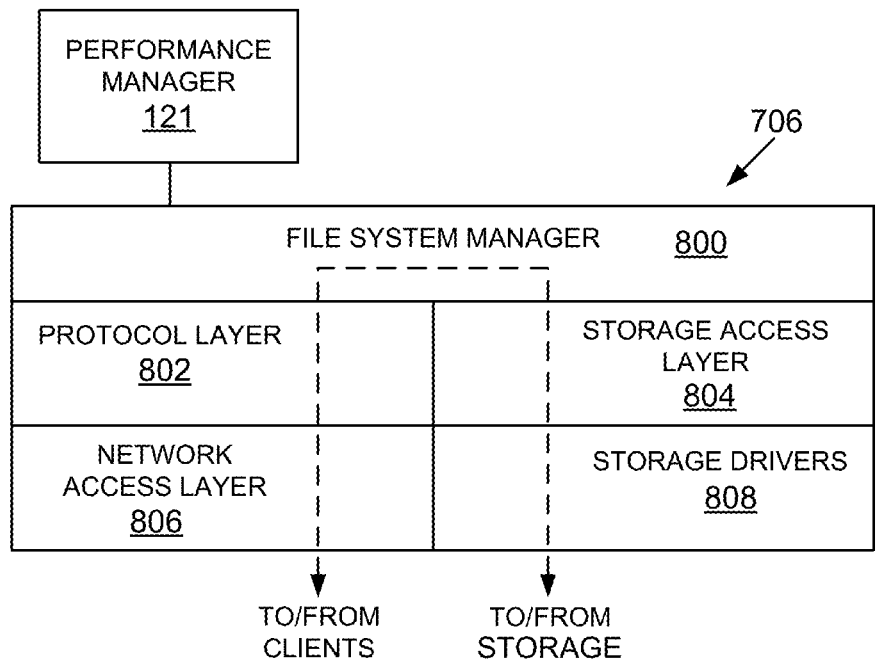
FIG. 8 shows an example of a storage operating system, used according to one aspect of the present disclosure.

Operating System:

FIG. 8 illustrates a generic example of storage operating system 706 (or 107, FIG. 1B) executed by node 208.1, according to one aspect of the present disclosure. The storage operating system 706 interfaces with the QOS module 109 and the performance manager 121 such that proper bandwidth and QOS policies are implemented at the storage volume level. The storage operating system 706 may also maintain a plurality of counters for tracking node utilization and storage device utilization information. For example, counters 306A-306B and 316A-316C may also be maintained by the storage operating system 706 and counter information is provided to the performance manager 121. In another aspect, performance manager 121 maintains the counters and they are updated based on information provided by the storage operating system 706.

In one example, storage operating system 706 may include several modules, or "layers" executed by one or both of network module 214 and storage module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow storage module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
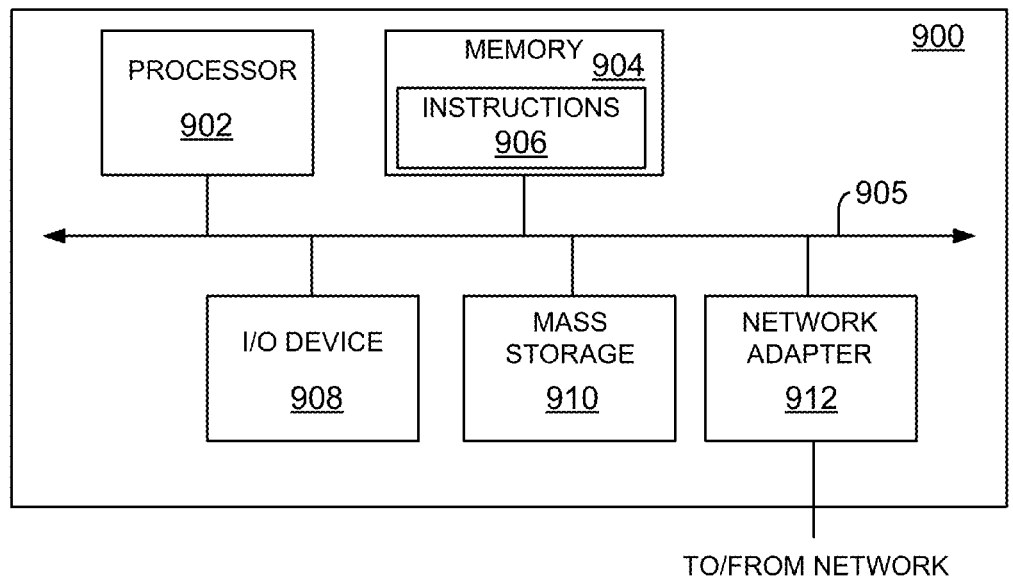
FIG. 9 shows an example of a processing system, used according to one aspect of the present disclosure.

Processing System:

FIG. 9 is a high-level block diagram showing an example of the architecture of a processing system 900 that may be used according to one aspect. The processing system 900 can represent performance manager 121, host system 102, management console 118, clients 116, 204, or storage system 108. Note that certain standard and well-known components which are not germane to the present aspects are not shown in FIG. 9.

The processing system 900 includes one or more processor(s) 902 and memory 904, coupled to a bus system 905.

The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps of FIGS. 4A and 5 described above may reside in and executed by processors 902 from memory 904.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems/performance manager described above can be a part of the server layer for providing storage services. Details regarding these layers are not germane to the inventive aspects.

Thus, methods and apparatus for managing resources in a storage environment have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

retrieving by a processor, performance data associated with a resource used in a networked storage system for reading and writing data at a storage device, where the performance data includes latency data indicating workload request processing delay, utilization data indicating resource utilization and a service time for processing workload requests;

transforming by the processor the retrieved performance data by removing any performance data beyond a threshold service time and using historically performance data within a threshold variation supplementing the retrieved performance data;

using the transformed performance data for generating by the processor a first portion of a relationship between latency and utilization by an observation based technique using a utilization bin value indicating similar utilization values for the resource and generating a second portion of the relationship by a model based technique using a queuing model;

determining by the processor available performance capacity of the resource based on a difference between optimum utilization of the resource indicated by the relationship, and actual utilization of the resource based on an operational point defined by a service level objective for a client; wherein the difference is compared to the optimum utilization to generate a determined performance capacity value;

storing by the processor, the determined performance capacity value in a data structure for future analysis; and reconfiguring one or more resources of the networked storage system, based on the determined available performance capacity value for managing resource usage in the networked storage system.

2. The machine implemented method of claim 1, wherein the resource is a processor for a networking module that provides networking functionality in the networked storage system.

3. The machine implemented method of claim 1, wherein the resource is an aggregate that includes the storage device.

4. The machine implemented method of claim 1, wherein the performance data includes inter-arrival time for workloads processed by the resource and used in the model based technique to generate the second portion.

5. The machine implemented method of claim 1, wherein the resource is a processor for a storage module that interfaces with the storage device for storing data.

6. The machine implemented method of claim 1, wherein actual utilization is based on identifying a workload whose processing can be delayed.

7. The machine implemented method of claim 1, wherein the operational point is based on utilization of a plurality of nodes of the networked storage system configured to operate as a high availability pair.

8. A non-transitory, machine readable storage medium having stored thereon instructions for performing a method, comprising machine executable code which when executed by at least one machine, causes the machine to:

retrieve by a processor, performance data associated with a resource used in a networked storage system for reading and writing data at a storage device, where the performance data includes latency data indicating workload request processing delay, utilization data indicating resource utilization and a service time for processing workload requests;

transform by the processor the retrieved performance data by removing any performance data beyond a threshold service time and using historical performance data within a threshold variation supplementing the retrieved performance data;

use the transformed performance data for generating by the processor a first portion of a relationship between latency and utilization by an observation based technique using a utilization bin value indicating similar utilization values for the resource and generating a second portion of the relationship by a model based technique using a queuing model;

determine by the processor available performance capacity of the resource based on a difference between optimum utilization of the resource indicated by the relationship, and actual utilization of the resource based on an operational point defined by a service level objective for a client; wherein the difference is compared to the optimum utilization to generate a determined performance capacity value;

store by the processor, the determined performance capacity value in a data structure for future analysis; and reconfigure one or more resources of the networked storage system, based on the determined available performance capacity value for managing resource usage in the networked storage system.

9. The storage medium of claim 8, wherein the resource is a processor for a networking module that provides networking functionality in the networked storage system.

10. The storage medium of claim 8, wherein the resource is an aggregate that includes the storage device.

11. The storage medium of claim 8, wherein the performance data includes inter-arrival time for workloads processed by the resource and used in the model based technique to generate the second portion.

12. The storage medium of claim 8, wherein the resource is a processor for a storage module that interfaces with the storage device for storing data.

13. The storage medium of claim 8, wherein actual utilization is based on identifying a workload whose processing can be delayed.

14. The storage medium of claim 8, wherein the operational point is based on utilization of a plurality of nodes of the networked storage environment configured to operate as a high availability pair.

15. A system comprising:

a memory containing machine readable medium comprising machine executable code having stored thereon instructions; and a processor module coupled to the memory to execute the machine executable code to:

retrieve performance data associated with a resource used in a networked storage system for reading and writing data at a storage device, where the performance data includes latency data indicating workload request processing delay, utilization data indicating resource utilization and a service time for processing workload requests;

transform the retrieved performance data by removing any performance data beyond a threshold service time and using historical performance data within a threshold variation supplementing the retrieved performance data;

use the transformed performance data for generating a first portion of a relationship between latency and utilization by an observation based technique using a utilization bin value indicating similar utilization values for the resource and generating a second portion of the relationship by a model based technique using a queuing model;

determine available performance capacity of the resource based on a difference between optimum utilization of the resource indicated by the relationship, and actual utilization of the resource based on an operational point defined by a service level objective for a client; wherein the difference is compared to the optimum utilization to generate a determined performance capacity value;

store the determined performance capacity value in a data structure for future analysis; and reconfigure one or more resources of the networked storage system, based on the determined available performance capacity value for managing resource usage in the networked storage system.

16. The system of claim 15, wherein the resource is a processor for a networking module that provides networking functionality in the networked storage system.

17. The system of claim 15, wherein the resource is an aggregate that includes the storage device.

18. The system of claim 15, wherein the performance data includes inter-arrival time for workloads processed by the resource and used in the model based technique to generate the second portion.

19. The system of claim 15, wherein the resource is a processor for a storage module that interfaces with the storage device for storing data.

20. The system of claim 15, wherein actual utilization is based on identifying a workload whose processing can be delayed.

* * * * *